(12) United States Patent
Cordova

(10) Patent No.: US 9,744,491 B2
(45) Date of Patent: Aug. 29, 2017

(54) IN-LINE MODULAR AIR FILTERING SYSTEM FOR DUCTWORK

(71) Applicant: Eric A. Cordova, Bigfork, MT (US)

(72) Inventor: Eric A. Cordova, Bigfork, MT (US)

(*) Notice: Subject to any disclaimer, the term of this patent is extended or adjusted under 35 U.S.C. 154(b) by 58 days.

(21) Appl. No.: 14/677,255

(22) Filed: Apr. 2, 2015

(65) Prior Publication Data
US 2015/0283490 A1  Oct. 8, 2015

Related U.S. Application Data

(60) Provisional application No. 61/973,945, filed on Apr. 2, 2014.

(51) Int. Cl.
| | | |
|---|---|---|
| *B04C 9/00* | (2006.01) | |
| *B04C 5/28* | (2006.01) | |
| *B01D 46/10* | (2006.01) | |
| *B01D 45/16* | (2006.01) | |
| *B01D 46/00* | (2006.01) | |
| *A01G 13/00* | (2006.01) | |
| *A01G 9/24* | (2006.01) | |
| *B01D 53/04* | (2006.01) | |

(52) U.S. Cl.
CPC ......... *B01D 46/0023* (2013.01); *A01G 9/246* (2013.01); *A01G 13/00* (2013.01); *B01D 46/00* (2013.01); *B01D 46/10* (2013.01); *B01D 53/0415* (2013.01); *B01D 2253/102* (2013.01); *B01D 2257/708* (2013.01); *B01D 2257/90* (2013.01); *B01D 2258/06* (2013.01); *B01D 2259/4508* (2013.01)

(58) Field of Classification Search
CPC ....... B04C 9/00; B04C 5/28; B04C 2009/004; B04C 2009/007; B01D 46/10; B01D 45/16; B01D 50/002
USPC .......... 55/502, 490, 497, 504, 521, 321, 348
See application file for complete search history.

(56) References Cited

U.S. PATENT DOCUMENTS

| | | | | |
|---|---|---|---|---|
| 3,854,888 A | * | 12/1974 | Frietzsche ............. | F01N 3/2853 29/463 |
| 5,533,302 A | * | 7/1996 | Lynch .................... | A01G 9/023 47/66.5 |
| 5,569,311 A | * | 10/1996 | Oda ................... | B01D 46/0002 55/493 |
| 6,159,260 A | * | 12/2000 | Hammes ................ | B01D 46/10 55/490 |
| 6,250,339 B1 | | 6/2001 | Ikegami et al. | |

(Continued)

*Primary Examiner* — Jacob T Minskey
*Assistant Examiner* — Minh-Chau Pham
(74) *Attorney, Agent, or Firm* — Morriss O'Bryant Compagni Cannon

(57) ABSTRACT

An in-line modular air filtering system for ductwork. A housing formed as a body and one or more caps has an intake opening at a first end and an outflow opening at a second end. The cap and body may attach to one another at a junction containing a seal with a stepped cross-sectional configuration. A set of retaining clamps may be used to secure the cap on the body. One or more replaceable filter assemblies may be retained in the housing for filtering air passed therethough. A filter assembly may include a seal having the stepped cross-sectional configuration for securing in the housing and sealing the cap and body junction. Filter assemblies may have differing porosities and/or different filtering mechanisms and may be stacked for applying multiple treatments.

17 Claims, 6 Drawing Sheets

(56) References Cited

U.S. PATENT DOCUMENTS

| | | | |
|---|---|---|---|
| 6,293,984 B1* | 9/2001 | Oda | B01D 46/10 55/497 |
| 8,409,312 B2* | 4/2013 | Gorg | B01D 46/0063 123/198 E |
| 2005/0193695 A1 | 9/2005 | Holmes et al. | |
| 2008/0115470 A1 | 5/2008 | Kuempel et al. | |
| 2008/0307759 A1 | 12/2008 | Reichter et al. | |
| 2009/0272085 A1 | 11/2009 | Gieseke et al. | |
| 2009/0301046 A1* | 12/2009 | Felber | B01D 46/0005 55/502 |
| 2010/0037570 A1 | 2/2010 | Osendorf et al. | |
| 2015/0020489 A1* | 1/2015 | Sudermann | B01D 46/0001 55/502 |
| 2015/0209711 A1* | 7/2015 | Walker | B01D 45/12 55/419 |
| 2015/0223418 A1* | 8/2015 | Collins | A01G 31/02 47/62 R |
| 2015/0273484 A1* | 10/2015 | Ho | B01D 45/16 55/321 |

\* cited by examiner

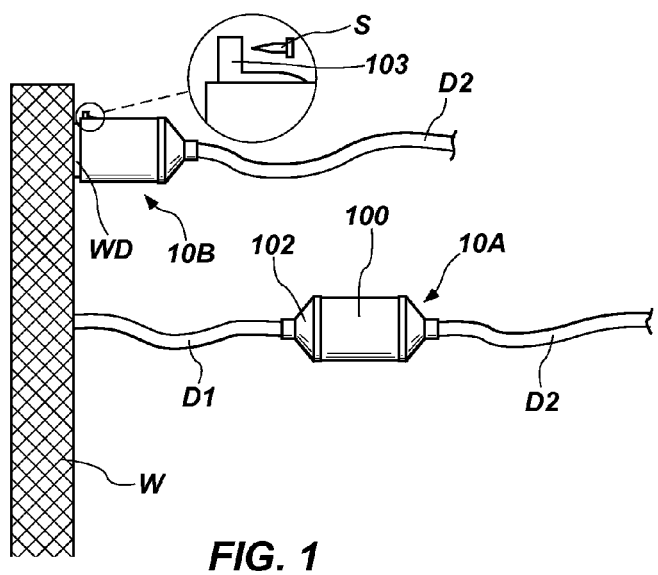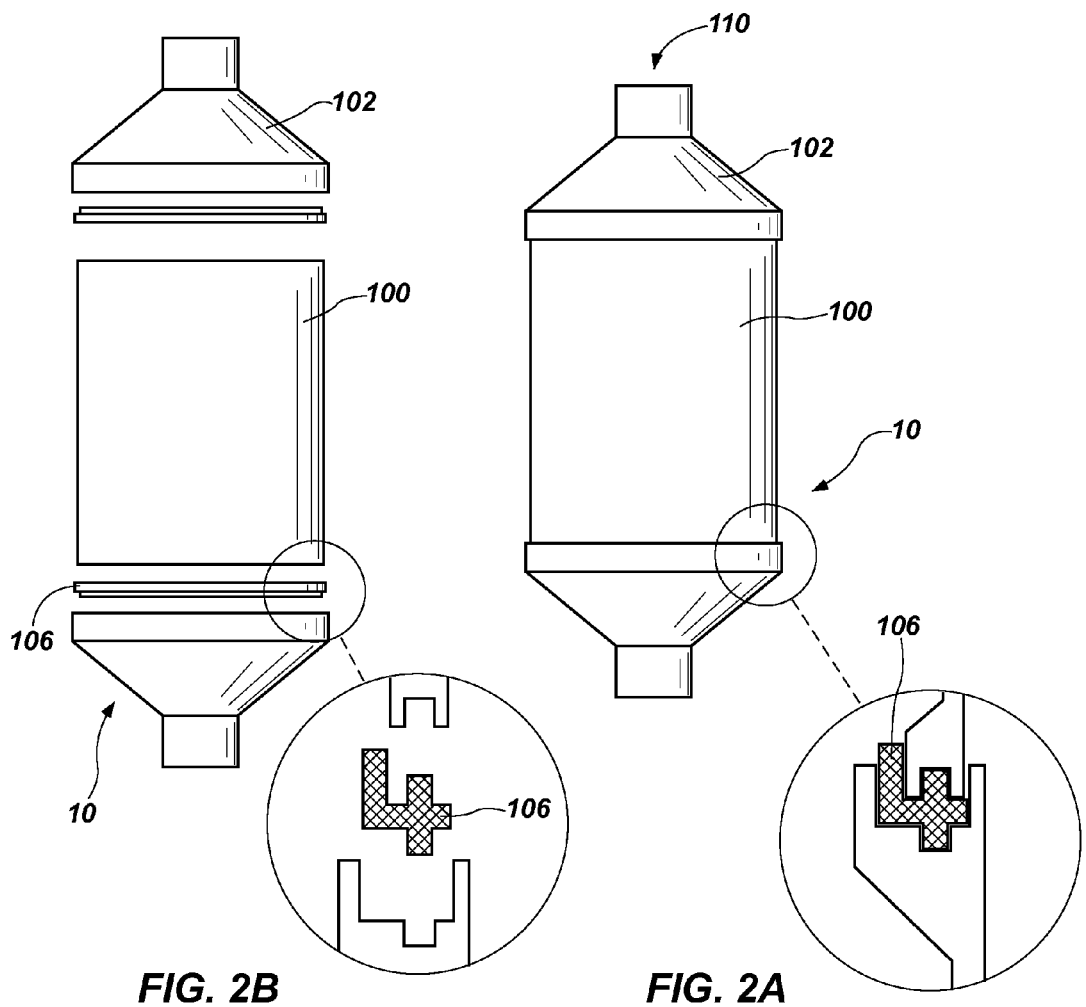
FIG. 1
FIG. 2B  FIG. 2A

IN-LINE MODULAR AIR FILTERING SYSTEM FOR DUCTWORK

CROSS-REFERENCE TO RELATED APPLICATION

This application claims the benefit of U.S. Provisional Application No. 61/973,945, filed Apr. 2, 2014, the disclosure of which is incorporated herein by reference in its entirety.

TECHNICAL FIELD

The present disclosure relates to air filtering systems and more specifically, to systems and apparatus for filtering air in intake ductwork.

BACKGROUND

Greenhouses require airflow to maintain a healthy environment to grow plants. Typically this airflow has been provided by vents that are open to the outside environment. However, this allows exposure of the plants to airborne contaminants, which can be harmful to immature plants. Where plants are grown for shipping to a different geographic region, this could lead to the shipping of undesirable plant disease vectors.

An air filtering system for a greenhouse air intake duct could reduce this problem. However, existing systems often require specialized installation and are expensive. An inexpensive in-line filtering system that could be easily installed into existing ductwork would be an improvement in the art.

SUMMARY

The present disclosure is directed to an in-line modular air filtering system for ductwork. A housing formed as a body and one or more caps has an intake opening at a first end and an outflow opening at a second end. The cap and body may attach to one another at a junction containing a seal with a stepped cross-sectional configuration. A set of retaining clamps may be used to secure the cap on the body.

One or more replaceable filter assemblies may be retained in the housing for filtering air passed therethrough. A filter assembly may include a seal having the stepped cross-sectional configuration for securing in the housing and sealing the cap and body junction. Filter assemblies may have differing porosities and/or different filtering mechanisms and may be stacked for applying multiple treatments.

The assembly may be placed into an existing air intake duct for a greenhouse by cutting duct and attaching the ends to the housing openings or may be placed into new ductwork during construction.

DESCRIPTION OF THE DRAWINGS

It will be appreciated by those of ordinary skill in the art that the various drawings are for illustrative purposes only. The nature of the present disclosure, as well as various embodiments, may be more clearly understood by reference to the following detailed description, to the appended claims, and to the several drawings. Further, while dimensions may be noted for certain parts, such dimensions are only exemplary and may be varied as the particular application requires.

FIG. 1 is side view of two illustrative embodiments of systems in accordance with this disclosure mounted for use.

FIG. 2A is a side cross-sectional view of an illustrative embodiment of a housing for a system in accordance with this disclosure in an assembled form, including a cross-sectional enlargement.

FIG. 2B is a side cross-sectional view of an illustrative embodiment of a housing for a system in accordance with this disclosure in an exploded form, including a cross-sectional enlargement.

DETAILED DESCRIPTION

Figure 3:
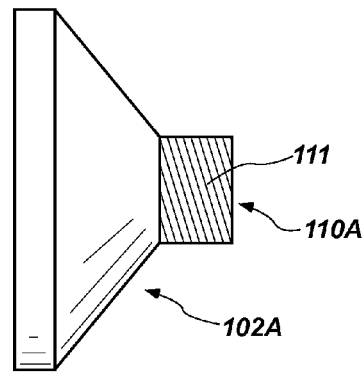
FIG. 3 is a cross-sectional view of a second embodiment of a cap for use in the system of FIGS. 1 and 2.

The present disclosure relates to apparatus, systems and methods related to a modular in-line air filtering system for ductwork. It will be appreciated by those skilled in the art that the embodiments herein described, while illustrating certain embodiments, are not intended to so limit this disclosure or the scope of the appended claims. Those skilled in the art will also understand that various combinations or modifications of the embodiments presented herein can be made without departing from the scope of this disclosure.

Turning to FIG. 1, to assemblies 10A and 10B for inline modular air filtering systems in accordance with this disclosure are depicted installed for usage. Wall W, which may be the wall of a greenhouse, includes ducting D1 or WD passing therethrough through which air flows. Inline system 10A is attached at an intake to duct D1 and at the outflow port to duct D2. For an existing greenhouse, the filter assembly 10A may be simply installed in an existing air intake duct by cutting the duct and attaching the ends to the housing openings as depicted.

Assembly 10B is directly connected to a larger duct WD where it emerges from wall W and this may be screwed directly to the wall W using a suitable bracket 103 and fastener S, such as a screw, as shown in the enlarged inset. Due to the larger size of the duct WD, the body 100 of the system may be directly sealed thereon, without the use of a "cap" portion 102. It will be appreciated that the body 100 may similarly be sealed directly to a wall W over an opening in the wall with the seal 106 (FIGS. 2A and 2B) compressed against the wall to provide a suitably airtight junction, and held in place by a suitable bracket. For a greenhouse-type installation, this may eliminate the need for additional ducting.

Turning to FIGS. 2A and 2B, the cap 102 and body 100 portion of an assembly 10 are depicted in cross-section, along with seal 106. Each housing 10 may be formed as a body 100 and one or more caps 102. As depicted, the body 100 may be an elongated cylinder with open ends, but it will be appreciated that other shapes may be used.

Each cap 102 has an opening 110 for connection to a duct work at a first end and an open second end for connection to body 100. In the depicted embodiment, each cap 102 has a generally circular cross section to allow mating with a cylindrical body 100, and tapers to a short tube for opening 110, giving the cap 102 a generally funnel shape. It will be appreciated that the shape of the cap and body may vary as desired for a particular installation.

As depicted in FIG. 3, in some embodiments of cap 102A, the walls of the short tube opening 110 may be threaded 111 to allow for connection by threaded fasteners to the ducting.

Cap 102 and body 100 may attach to one another at a junction containing a seal 106. As shown in the enlarged inset, the seal 106 may have a "stepped" cross-sectional configuration and the cap 102 and body 100 may include flanges and channels that correspond to the seal configuration. This can provide multiple sealing points across the junction to reduce the possibility of a leak. In the depicted embodiment, the seal 106 has a generally L shaped section and a generally T-shaped section. This may provide multiple points where the junction between the cap 102 and body 100 are sealed. It will be appreciated that this depicted embodiment of a seal 106 is only illustrative and that some variation may be made as a particular installation may require.

The seal 106 may be constructed from a suitable material, such as a silicone or rubber material with flexibility. Similarly, the housing components, caps 102 and body 100 may be formed of a more rigid material, such as an injected molded plastic.

Figure 4A:
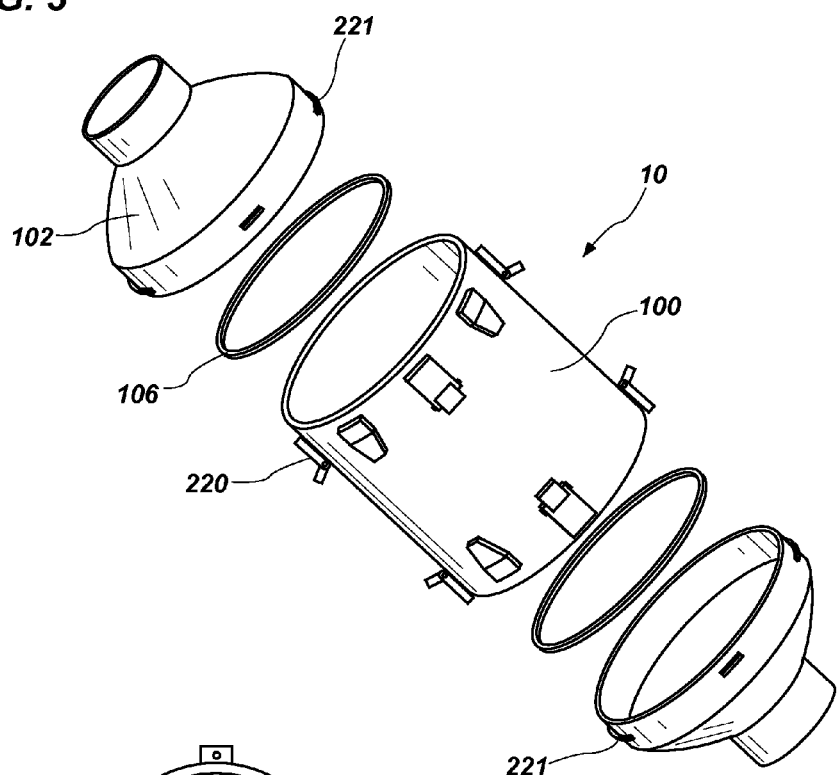
FIGS. 4A and 4B are perspective exploded side and top views of the housing of FIGS. 2A and 2B.
Figure 4B:
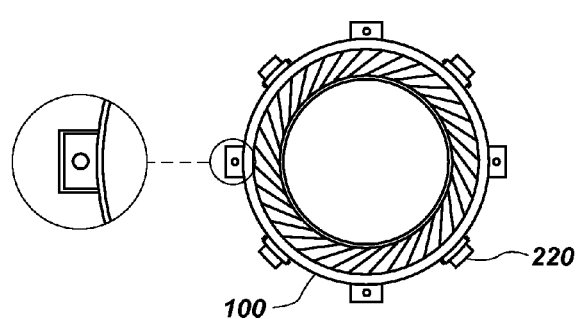

Turning to FIGS. 4A and 4B, one mechanism for retaining a cap 102 on the body 100 of the housing is depicted. A number of clips 221 or attachment points are disposed on the cap 102, and may be formed as hooks or ledges on the proximal outer wall of the cap. A similar number of locking fasteners 220 may be disposed on the outer wall of the body 100, near an open end and correspond to the clips 221. Each fastener may include a loop or other structure that can grasp a clip 221 and then lock to retain cap 102 in a compressed closed position with respect to the body 100.

Figure 5:
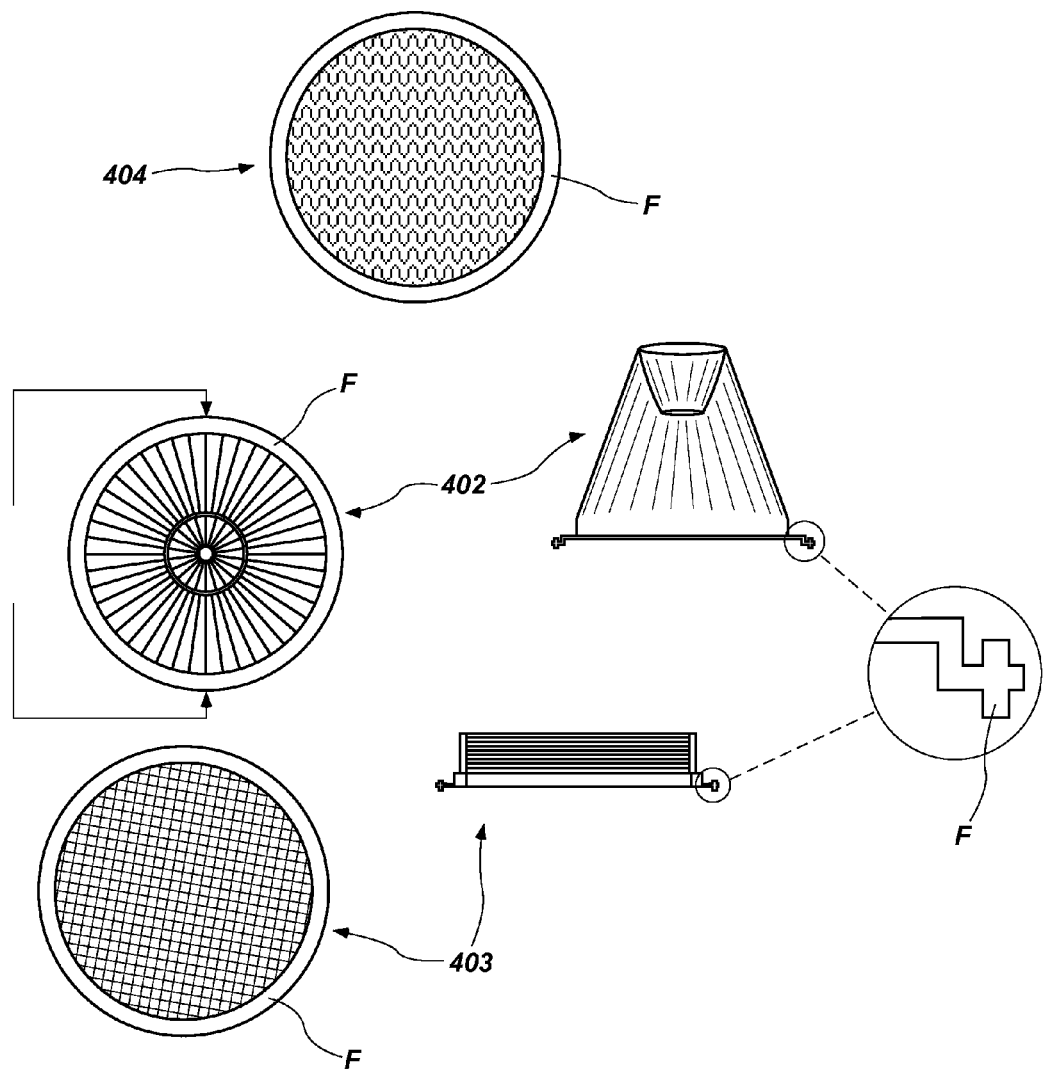
FIGS. 5, 6A, 6B, 7A, 7B, 8 and 9 depict various filter inserts and extensions for the systems of FIGS. 1 through 4B.
Figure 6A:
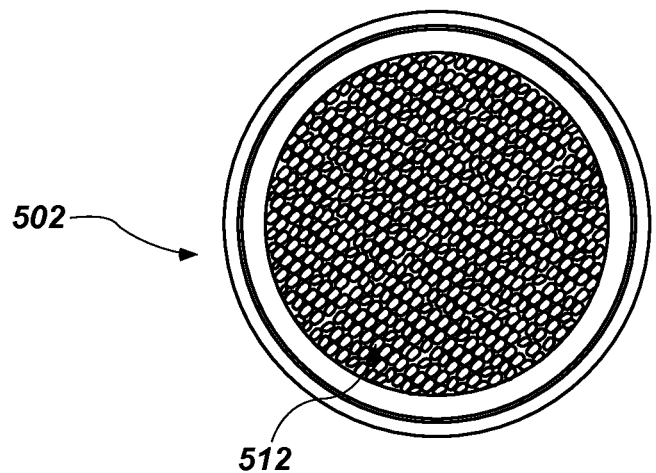
Figure 6B:
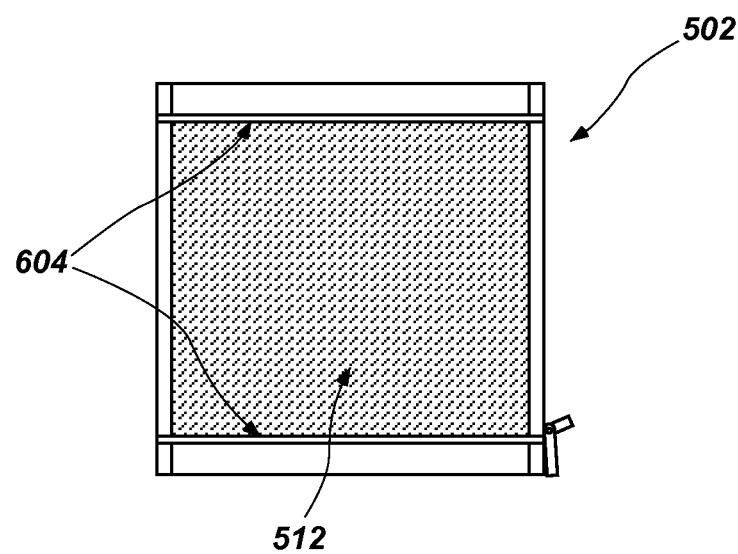
Figure 7A:
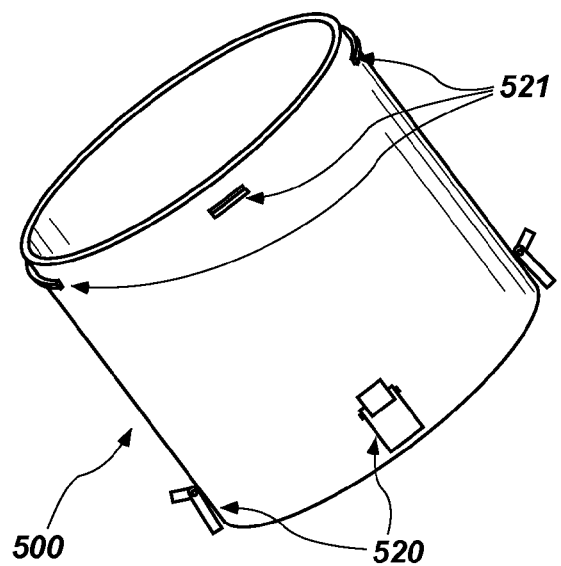
Figure 7B:
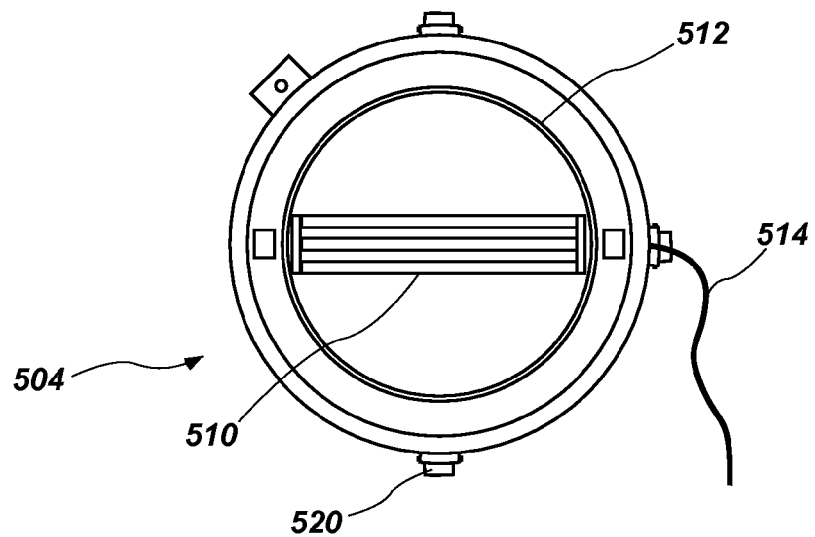

Turning to FIG. 5, several different replaceable filter assemblies which may be retained in the housing 10A or 10B for filtering air passed therethrough are depicted. In FIG. 5, a dust filter 404, a HEPA filter 402 and a "clean room" filter 403 are all depicted. As shown in the enlarged inset, each filter assembly may include filter portion supported by a frame F for insertion into body 100. The frame F may include a portion having the stepped cross-sectional configuration for securing in the housing and sealing the cap and body junction, which may have the same L and T shaped cross-section as seal 106. This allows the filter assembly to be secured in place in the housing by placement into the junction in between cap 102 and body 100 in lieu of a seal 106. Where a housing 100 has two caps 102, two such assemblies can be secured, one at either end. The frame F may be made from suitable materials and the stepped portion may be seal secured to the remainder of the frame.

Filter assemblies may have differing porosities and/or different filtering mechanisms and may be stacked for applying multiple treatments. For example, housing 404 is constructed as a dust filter and may be used as a pretreatment filter to remove larger contaminants before additional filtering. The filtering element may be fiberglass strands contained in the assembly cavity at a sufficient density to trap airborne dust therein as dust passes therethrough.

Assembly 402 may be for a HEPA-style filter which includes a mat of randomly arranged fibers within a frame. As depicted, the mat may be formed into a folded conical shape. The fibers may be fiberglass and may possess diameters between 0.5 and 2.0 micrometers.

Assembly 403 may be a "clean room" style filter removing particles of even smaller diameters, such as a HEPA filter that complies with the Department of Energy standard, in that it removes at least 99.97% of airborne particles 0.3 micrometers (μm) in diameter with a minimal resistance to airflow or an ULPA filter that can remove at least 99.999% of dust, pollen, mold, bacteria and any airborne particles with a size of 120 nanometers (0.12 μm) or larger, passing therethrough. Such filters can comply with any of the following standards, which are incorporated by reference herein: IEST-RP-CC001: HEPA and ULPA Filters, IEST-RP-CC007: Testing ULPA Filters, IEST-RP-CC022: Testing HEPA and ULPA Filter Media, and IEST-RP-CC034: HEPA and ULPA Filter Leak Tests.

It will be appreciated that a less efficient filter assembly, such as a dust filter 404 may be placed at an "upstream" end of the housing 10 for an initial air filtration and a HEPA or ULPA filter placed at the "downstream" end for additional cleaning of air.

Figure 8:
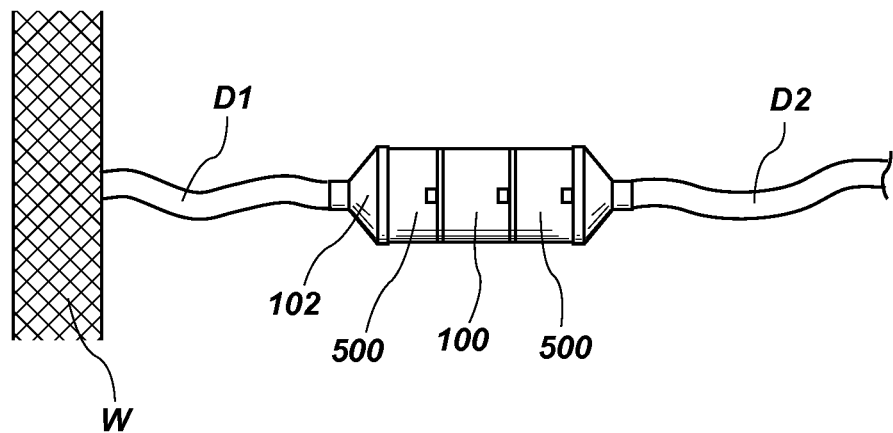

FIGS. 6A, 6B, 7A and 7B depict two additional filter assemblies, an activated charcoal filter 502 and an UV filter 504 in perspective (6B, 7A) and end (6A, 7B) views. As depicted, such filters are formed as part of a body extension 500, which may be a cylinder for attachment to body 100 to thereby lengthen housing 10 and add additional functionality, as depicted in FIG. 8. It will be appreciated that these filter assemblies may also be constructed with a frame, as with the assemblies of FIG. 5, instead of in a housing extension 500 (as may the assemblies of FIG. 4), depending on the desired usage. The housing extension 500 includes clips 521 and locking fasteners 520 disposed near opposite open ends in order to allow connection to the body 100 and a cap 102 or other extension 500.

As depicted in FIG. 6, an activated charcoal assembly/extension 502 contains activated charcoal through which the airflow is passed to remove volatile chemicals by absorption. The activated charcoal 502 is retained in the housing by screens 604, which allow air to pass therethrough. Typically, such a filter would be used in conjunction with other filter assemblies, such as a HEPA filter. This allows for treatment of contaminant chemicals or odors in the airflow at a reasonable cost.

The UV assembly/extension 504 depicted in FIG. 7 contains UV lamps 510 that sterilize the air passing thereover. The housing extension may be lined by a reflective material 512 to ensure there are no non-exposed areas and power for the lamps may be provided by suitable wiring 514.

Figure 9:
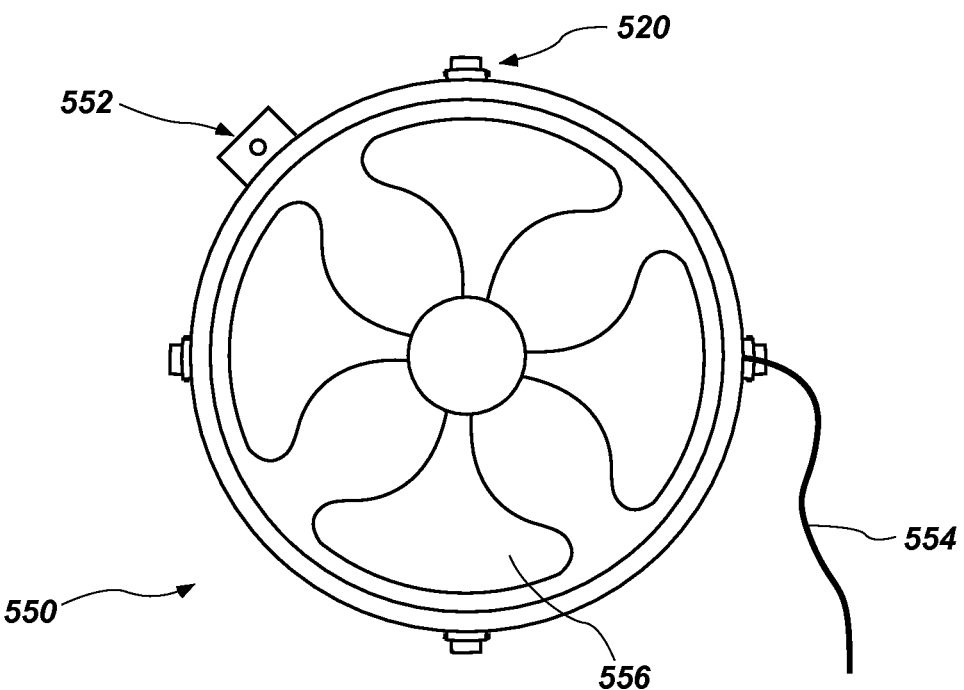

A fan assembly/extension 550 is depicted in FIG. 9 and contains a fan 556 along with the required drive components to assist or airflow through the system 10. Power for the fan and its motor may be provided by suitable wiring 554. A suspension bracket 552 may be provided on the housing to allow for additional support of the weight of the fan and drive assembly.

It will be appreciated that the examples of usage of filter systems present herein is only illustrative. For example, although discussed in connection with greenhouse air intake systems, filter systems 10 may be used on intake, exhaust, or on recirculation systems. In a greenhouse setting, such a filter system may be used on the exhaust to control pollen disbursement, or the spread of disease. In other settings it could be used to filter contaminants such as asbestos, fumes, odors, etc. from exhaust. In a recirculation air system, it could be used to filter the air of dust, mold/mildew spores, bacteria, odors, etc. Such filter systems could be useful as part of the environmental control for a clean room or in any setting where air filtration using ducting is desired.

While this disclosure has been described using certain illustrative embodiments, the teachings of the present disclosure can be further modified within its spirit and scope. This application is therefore intended to cover any variations, uses, or adaptations of this disclosure using its general principles. Further, this application is intended to cover such departures from the present disclosure as come within known or customary practices in the art.

What is claimed is:

1. An in-line modular air filtering system for ductwork, comprising:
    at least a first housing formed as a tubular body defined by at least one sidewall, the at least a first housing having an open first end and an opposite open second end and a bore defined by the at least one sidewall, wherein the sidewall of the body has a groove formed therein around the open first end, with the sidewalls of the groove parallel to an axis of the housing defined by the first open end and second open end, a first filter assembly disposed within the at least a first housing between the open first end and the open second end;
    at least a first cap for closing the first open end of the at least a first housing, the at least a first cap including a surrounding sidewall defining a housing attachment end, which has a first groove formed around a circumference thereof, sized to receive the sidewall of the open first end of the housing therein, and a second smaller groove formed in the first groove and parallel thereto, the at least a first cap further including a smaller opening for attaching to ductwork, the smaller opening positioned to align with the bore of the tubular body upon connection thereto; and
    at least a first seal having a stepped cross-sectional configuration which includes a generally L-shaped portion and a generally T-shaped portion, such that when placed in position with the open first end of the at least first housing and the at least a first cap, the seal lies within the groove around the first open end of the at least first housing, and the first and second grooves of at least a first cap.

2. The in-line modular air filtering system for ductwork of claim 1, wherein the first filter assembly is selected from the group comprising dust filters, HEPA filters, ULPA filters, activated charcoal filters, and UV filters.

3. The in-line modular air filtering system for ductwork of claim 1, wherein the at least first housing is secured to a wall with the open first end connected to ducting passing therethrough.

4. The in-line modular air filtering system for ductwork of claim 1, wherein the sidewall of the body of the at least a first housing has a second groove formed therein around the open second end, with the sidewalls of the second groove parallel to an axis of the housing defined by the first open end and second open end.

5. The in-line modular air filtering system for ductwork of claim 4, further comprising a second cap for closing second open end of the at least a first housing, the second cap including a surrounding sidewall defining a housing attachment end, which has a first groove formed around a circumference thereof, sized to receive the sidewall of the open second end of the housing therein, and a second smaller groove formed in the first groove and parallel thereto, the second cap further including a smaller opening for attaching to ductwork; and a second seal having a stepped cross-sectional configuration, such that when placed in position with the open second end of the at least first housing and the second cap, the second seal lies within the second groove around the second open end of the at least first housing, and the first and second grooves of the second cap.

6. The in-line modular air filtering system for ductwork of claim 1, further comprising at least a second housing formed as a tubular body defined by at least one sidewall, the at least a second housing having an open first end and an open second end, wherein the sidewall of the body has a groove formed therein around the open first end, with the sidewalls of the groove parallel to an axis of the at least a second housing defined by the first open end and the second open end, the at least a second housing attached to the open second end of the at least a first housing.

7. The in-line modular air filtering system for ductwork of claim 6, further comprising a second filter assembly disposed within the at least a second housing between the open first end and the open second end, the second filter assembly selected from the group comprising dust filters, HEPA filters, ULPA filters, activated charcoal filters, and UV filters.

8. The in-line modular air filtering system for ductwork of claim 6, further comprising a fan assembly for moving air disposed within the at least a second housing between the open first end and the open second end.

9. The in-line modular air filtering system for ductwork of claim 6, wherein the at least a second housing is retained in connection to the at least a first housing by one or more retaining clamps.

10. The in-line modular air filtering system for ductwork of claim 6, further comprising a removable filter assembly comprising a filter portion supported by a surrounding frame, wherein the frame includes a portion having a stepped cross-sectional configuration such that when placed in position with the open first end of the at least first housing and the at least a first cap, a portion of the frame lies within the groove around the first open end of the at least first housing, and portions of the frame lie within the first and second grooves of at least a first cap.

11. The in-line modular air filtering system for ductwork of claim 10, wherein the frame includes a portion of the frame having the stepped cross-sectional configuration comprises a portion of the frame having a cross section with a generally L-shaped portion and a generally T-shaped portion.

12. The in-line modular air filtering system for ductwork of claim 1, wherein the at least a first cap is retained in connection to the at least a first housing by one or more retaining clamps.

13. An in-line modular air filtering system for ductwork, comprising:
    at least a first housing formed as a tubular body defined by at least one sidewall, the at least a first housing having an open first end and an open second end, wherein the sidewall of the body has a groove formed therein around the open first end, with the sidewalls of the groove parallel to an axis of the housing defined by the first open end and second open end,
    at least a second housing formed as a tubular body defined by at least one sidewall, the at least a second housing having an open first end and an open second end, the open second end of the at least a second housing having a first groove formed around a circumference thereof, sized to receive the sidewall of the open first end of the at least a first housing therein, and a second smaller groove formed in the first groove and parallel thereto;
    at least a first seal having a stepped cross-sectional configuration which includes a generally L-shaped portion and a generally T-shaped portion, such that when placed in position with the open first end of the at least first housing and the open second end of the at least a second housing, the seal lies within the groove around the first open end of the at least first housing, and the first and second grooves of at least a second housing; and
    at least a first filter assembly.

14. The in-line modular air filtering system for ductwork of claim 13, wherein the at least a first filter assembly comprises a removable filter assembly comprising a filter portion supported by a surrounding frame, wherein the frame includes a portion having a stepped cross-sectional configuration such that when placed in position with the open first end of the at least first housing and open second end of the at least a second housing, a portion of the frame lies within the groove around the first open end of the at least first housing, and portions of the frame lie within the first and second grooves of at least a second housing.

15. The in-line modular air filtering system for ductwork of claim 13, the at least a first housing is retained in connection to the at least a second housing by one or more retaining clamps.

16. The in-line modular air filtering system for ductwork of claim 13, wherein the at least a first filter assembly is selected from the group comprising dust filters, HEPA filters, ULPA filters, activated charcoal filters, and UV filters.

17. The in-line modular air filtering system for ductwork of claim 1, wherein the at least a first housing further comprises a second groove formed therein around the open second end, with the sidewalls of the groove parallel to an axis of the housing defined by the first open end and second open end, and further comprising a cap for closing second open end of the at least a first housing, the second cap including a surrounding sidewall defining a housing attachment end, which has a first groove formed around a circumference thereof, sized to receive the sidewall of the open second end of the at least a first housing therein, and a second smaller groove formed in the first groove and parallel thereto, the second cap further including a smaller opening for attaching to ductwork; and a second seal having a stepped cross-sectional configuration, such that when placed in position with the open second end of the at least first housing and the cap, the second seal lies within the second groove around the second open end of the at least first housing, and the first and second grooves of the cap.

* * * * *